United States Patent
Islam et al.

(10) Patent No.: US 12,184,123 B2
(45) Date of Patent: Dec. 31, 2024

(54) THREE-DIMENSIONAL AIRGAP ELECTRIC MACHINES EMPLOYING WINDING EMBEDDED LIQUID COOLING

(71) Applicant: North Carolina State University, Raleigh, NC (US)

(72) Inventors: Md Sariful Islam, Raleigh, NC (US); Iqbal Husain, Raleigh, NC (US); Ritvik Chattopadhyay, Raleigh, NC (US); Gregory D. Buckner, Raleigh, NC (US)

(73) Assignee: NORTH CAROLINA STATE UNIVERSITY OFFICE OF RESEARCH COMMERCIALIZATION, Raleigh, NC (US)

( * ) Notice: Subject to any disclaimer, the term of this patent is extended or adjusted under 35 U.S.C. 154(b) by 4 days.

(21) Appl. No.: 17/482,645

(22) Filed: Sep. 23, 2021

(65) Prior Publication Data

US 2022/0094220 A1   Mar. 24, 2022

Related U.S. Application Data

(60) Provisional application No. 63/082,689, filed on Sep. 24, 2020.

(51) Int. Cl.
| | |
|---|---|
| *H02K 1/20* | (2006.01) |
| *H02K 1/16* | (2006.01) |
| *H02K 1/17* | (2006.01) |

(52) U.S. Cl.
CPC ............... *H02K 1/20* (2013.01); *H02K 1/16* (2013.01); *H02K 1/17* (2013.01)

(58) Field of Classification Search
CPC .. H02K 3/04; H02K 3/24; H02K 1/20; H02K 9/19

(Continued)

(56) References Cited

U.S. PATENT DOCUMENTS

| | | | | |
|---|---|---|---|---|
| 6,166,469 A | * | 12/2000 | Osama | H02K 16/00 310/90.5 |
| 9,325,219 B2 | | 4/2016 | Hunstable | |

(Continued)

FOREIGN PATENT DOCUMENTS

| | | | | |
|---|---|---|---|---|
| CN | 102810917 A | * | 12/2012 | ............... H02K 1/12 |
| CN | 106655564 A | * | 5/2017 | |

(Continued)

OTHER PUBLICATIONS

Islam, et al. "Slotless Lightweight Motor for Aerial Applications", IEEE Transactions on Industry Applications, vol. 55, No. 6, Nov. 2019.

(Continued)

*Primary Examiner* — Jose A Gonzalez Quinones
(74) *Attorney, Agent, or Firm* — Thomas | Horstemeyer, LLP

(57) ABSTRACT

Various examples are provided related to 3D airgap electric machines and winding embedded liquid cooling. In one example, an electric machine includes a stator assembly with stator windings supported by a stator core and an outer rotor assembly includes a radial plate surrounding the stator assembly and an endplate at a first end of the radial plate adjacent to the first end of the stator core. The stator windings can include a first portion extending along an axial length of the stator core and a second portion at a first end of the stator core that extends radially inward towards a shaft of the electric machine. The radial plate can include magnets distributed about the radial plate. In another example, a stator assembly includes stator windings supported by a stator core with a winding support including cooling channels distributed between the stator windings. The winding support can be nonmagnetic.

15 Claims, 20 Drawing Sheets

(58) Field of Classification Search
USPC ............ 310/52, 54, 198, 200, 202, 208, 214
See application file for complete search history.

(56) References Cited

U.S. PATENT DOCUMENTS

| | | | | |
|---|---|---|---|---|
| 2014/0285048 | A1* | 9/2014 | Seo .......................... | H02K 1/27 |
| | | | | 310/198 |
| 2021/0281143 | A1* | 9/2021 | Lambourg ............... | H02K 9/19 |

FOREIGN PATENT DOCUMENTS

| | | | | |
|---|---|---|---|---|
| CN | 109995190 A | * | 7/2019 | ............... H02K 1/12 |
| EP | 2958215 A1 | * | 12/2015 | ............. F03D 15/20 |
| EP | 3364038 A2 | * | 8/2018 | ............. F04D 17/10 |

OTHER PUBLICATIONS

Yoon, et al., "A high speed, high fequency, air core PM machine for aircraft application", IEEE, 2016.

Zhao, et al., "Dual airgap stator and rotor permanent magnet machines with spoke type configurations using phase group concentrated coil windings", IEEE Transactions on Industry Applications, vol. 53, Jul./Aug. 2017.

Qu, et al., "Dual rotor, radial flux, toroidally wound, permanent magnet machines", IEEE Transactions on Industry Applications, vol. 39, No. 6, Nov./Dec. 2003.

Hunstable, et al., "Magnetic torque tunnel", Linear Labs, Nov. 5, 2019.

* cited by examiner

PERFORMANCES SUMMARY AND COMPARISON OF 10-POLE MACHINE

| Parameters | Design-I: 2D-airgap machine | Design-II: Proposed 3D-airgap machine | Design-III: Equivalent radial flux machine |
|---|---|---|---|
| slot/pole | 12/10 | 12/10 | 12/10 |
| Outer diameter | 124 | 124 | 124 |
| Active axial length (mm) | 30 | 30 | 64 |
| Active volume (liter) | 0.36 | 0.36 | 0.77 |
| $I_{peak}$ (A) | 100 | 100 | 100 |
| $V_{dc}$ (V) | 17.50 | 34 | 34 |
| $\omega_m$ (r/min) | 5,000 | 5,000 | 5,000 |
| Magnet | N48UH | N48UH | N48UH |
| Lamination (mm) | 0.35 | 0.35 | 0.35 |
| Torque, T (Nm) | 2.36 | 5.04 | 5.04 |
| Core loss (W), $P_{core}$ | 12 | 25 | 24 |
| Dc-copper loss (W), $P_{dc}$ | 31.6 | 40.60 | 48 |
| T/$P_{dc}$ (Nm/W) | 0.075 | 0.125 | 0.105 |
| Power density, kW/liter | 3.45 | 7.30 | 3.50 |
| Total mass (kg) | 1.76 | 2.08 | 3.40 |
| Torque density, Nm/kg | 1.35 | 2.08 | 1.48 |
| Power density, kW/kg | 0.70 | 1.10 | 0.78 |
| $\eta$ (%) | 96.60 | 97.60 | 97.30 |

FIG. 4A

PARAMETERS OF INVESTIGATED MOTOR

| Parameters | Values |
|---|---|
| Peak Torque (Nm) | 115 |
| Peak power (kW) | 120 |
| Base speed (r/min) | 10,000 |
| Rotor outer diameter (mm) | 214 |
| Active length (mm) | 55 |
| Stator yoke inner radius (mm) | 138 |
| Stator yoke outer radius (mm) | 160 |
| Slot/pole | 12/14 |
| Turns/slot | 16 |
| Peak Current (A) | 510 |
| Lamination (mm) | 0.27 |
| Magnet | N42UH |

LOSS DATA OF THE SLOTLESS MACHINE AT PEAK POWER OPERATION

| Current Density | Copper Loss | Stator Iron Loss |
|---|---|---|
| 33 A(rms)/mm² | 3,231 W | 92 W |

MATERIALS USED IN MOTOR UNDER CONSIDERATION

| Component | Material | Conductivity (W/m-K) |
|---|---|---|
| Stator yoke | Laminated steel | 28 |
| Winding | Copper | 385 |
| Winding support | Coolpoly D5506 | 9.4 |
| Stator support | Aluminum | 205 |

TEMPERATURE RISE AT DIFFERENT CURRENT DENSITIES

| Slot Current Density (J) ($A/mm^2$) | Output Power (kW) | Total Loss (W) | $\Delta T_{yoke}$ (LPTN) (°C) | $\Delta T_{yoke}$ (CFD) (°C) | $\Delta T_{tooth}$ (LPTN) (°C) | $\Delta T_{tooth}$ (CFD) (°C) | $\Delta T_{slot}$ (LPTN) (°C) | $\Delta T_{slot}$ (CFD) (°C) |
|---|---|---|---|---|---|---|---|---|
| 16.4 | 60 | 893 | 33.8 | 34.0 | 19.1 | 25.4 | 39.0 | 42.6 |
| 19.2 | 70 | 1185 | 44.9 | 45.3 | 25.4 | 33.8 | 51.7 | 56.7 |
| 23.3 | 85 | 1708 | 64.8 | 65.4 | 36.5 | 48.9 | 74.5 | 81.9 |

THREE-DIMENSIONAL AIRGAP ELECTRIC MACHINES EMPLOYING WINDING EMBEDDED LIQUID COOLING

CROSS REFERENCE TO RELATED APPLICATIONS

This application claims priority to, and the benefit of, U.S. provisional application entitled "Three-Dimensional Airgap Electric Machines Employing Winding Embedded Liquid Cooling" having Ser. No. 63/082,689, filed Sep. 24, 2020, which is hereby incorporated by reference in its entirety.

STATEMENT REGARDING FEDERALLY SPONSORED RESEARCH OR DEVELOPMENT

The present invention was made with United States Government support under Grant No. DE-EE0008705 awarded by the U.S. Department of Energy. The United States Government has certain rights in the invention.

BACKGROUND

The rapid growth of electric aircraft, air-taxi, drones, and electric vehicles demands higher power and torque density powertrain system. The battery storage unit comes in as a very low energy density component within the electric powertrain system. High power density electric machines and drives are valued as a compensator for the low energy density of today's battery technology. US DoE has set research goals of achieving 50 kW/liter for electric machines and 100 kW/liter for drives; US ARPA-e has also set an aggressive goal of 12 kW/kg for the combined power density of machines, drives and thermal unit for more electric aircrafts. Wide band gap (WBG) based drives are gaining popularity to increase the power density and efficiency of the drives, which can be achieved by reducing the size of passive components and the overall volume of the drive. To achieve high power and torque densities for the electric machine, permanent magnet (PM) configurations are the popular choice. Among different PM configurations, a slotless stator with outer rotor Halbach topology is gaining interest to achieve high power density at higher speeds. High pole count slotless motors meet the criteria by eliminating laminated teeth and reduced back iron in the stator. Moreover, the use of a Halbach magnet array further eliminates the need for lamination on the rotor. The primary heat source in slotless motor is the copper loss. The non-magnetic winding support typically used in slotless motor are poor thermal conductors. Therefore, the reduction in mass comes at the cost of higher operating temperature for the same current densities when compared to a conventional slotted motor.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4A is a table illustrating a comparison of 2D-airgap and 3D-airgap machine designs, in accordance with various embodiments of the present disclosure.

DETAILED DESCRIPTION

Figure 1A:
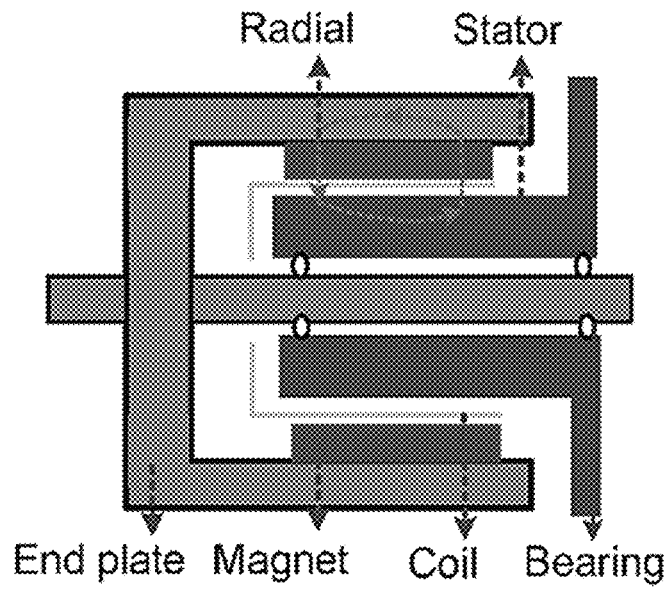
FIGS. 1A and 1B illustrate an example of a 2D-airgap machine (Slotless-Halbach radial flux) with extended end-winding, concept and 3D FEA model, in accordance with various embodiments of the present disclosure.

Disclosed herein are various examples related to three-dimensional (3D) airgap electric machines and winding embedded liquid cooling (WELC). Reference will now be made in detail to the description of the embodiments as illustrated in the drawings, wherein like reference numbers indicate like parts throughout the several views.

A radial flux slotless motor has non-magnetic teeth/winding support and laminated back-iron. This allows a slotless motor to operate at high-speed having enhanced power density with manageable frequency-dependent losses. The magnetically inactive regions of an outer rotor slotless motor are the spaces beneath the lamination, end-winding and endplate. The end-winding region does not contribute to torque production, but rather contributes to the total losses. It also consumes a lot of space within the frame of a machine. Similarly, the endplate only contributes to structural integrity and not to torque production. Converting the inactive regions to torque producing segments can allow a majority of the mass and volume in a machine to become part of the active segments. This can substantially enhance the volume power density (kW/liter) and mass power density (kW/kg) of an electric machine.

The approach can open the path to achieve the aggressive target densities desired in next generation electric machines. Multiple air-gaps machines are gaining interest for this purpose where the topologies are mainly dual-stator-single-rotor or single-stator-dual-rotor configurations. Even though these configurations have multiple airgaps, the airgaps are either in the radial direction or in the axial direction. Moreover, a multiple stator-rotor configuration makes it difficult to design the thermal management system and increases manufacturing complexity. A magnetic tunnel single stator dual rotor configuration to combine both axial and radial airgaps has been introduced to improve the torque density of PM machines. However, since the stator is sandwiched between the rotors, this concept has a complex structure which makes it difficult to manufacture and to manage heat removal.

In this disclosure, an electromagnetic and structural integration of radial flux and axial flux machines with a new airgap structure, which can only be visualized in three dimensions, is proposed to convert the inactive regions of a radial flux slotless motor into the torque producing component. The disclosed three-dimensional (3D) concept is referred to as a "3D-airgap machine" and a radial flux machine is referred to as a "2D-airgap machine." The machines are labeled as 2D-airgap or 3D-airgap based on the flux path in a three-dimensional (3D) plane. Since conventional radial flux machines have a uniform airgap only in the radial direction, which can be visualized from a 2D cross-section and the flux doesn't vary along the axial length, the radial flux machine has been labeled as a 2D-airgap machine. The disclosed 3D-airgap machine has a single-stator-single-rotor configuration, which has a significantly less complex structure compared to other concepts with multiple airgap layers. The performance of the 3D-airgap machine can be derived using, e.g., 3D finite element analysis (FEA). Moreover, a comprehensive comparison of the 3D-airgap machine with a 2D-airgap machine is presented to illustrate the efficacy. The performance of a comparable 2D-airgap machine with an equivalent torque capability as that of the 3D-airgap machine are also presented to see the benefits of the new concept. Finally, a simulation method for the 3D-airgap machine using the superposition principle can be used to reduce the computational time of the 3D FEA.

In addition, a winding embedded liquid cooling (WELC) method is disclosed to increase continuous current density compared to conventional liquid cooling methods for a slotless machine. Thermal management of slotless motor is more challenging since this motor has lower thermal mass. This issue can be addressed by introducing cooling channels in close proximity to the winding. Effective thermal paths of a slotless machine can be identified. The nonmagnetic thermal plastic-based winding support can also accommodate cooling channels. Another set of coolant pipes can be placed underneath the stator to provide a parallel path for heat flow from the winding. Since a significant portion of the winding is in contact with the stator yoke, these channels can further reduce the thermal resistance from source to sink. Therefore, the temperature rise can be maintained within the limit for worst-case operation. A comprehensive analysis of the disclosed thermal management system is presented and compared with conventional axial water jacket cooling. Both steady-state and transient performance of the proposed concept for a 120 kW slotless machine is investigated using a lumped parameter model and computational fluid dynamics (CFD) analysis. The dependency of winding temperature on the thermal conductivity of winding support is also investigated.

3D-Airgap Slotless Machine

Figure 1B:
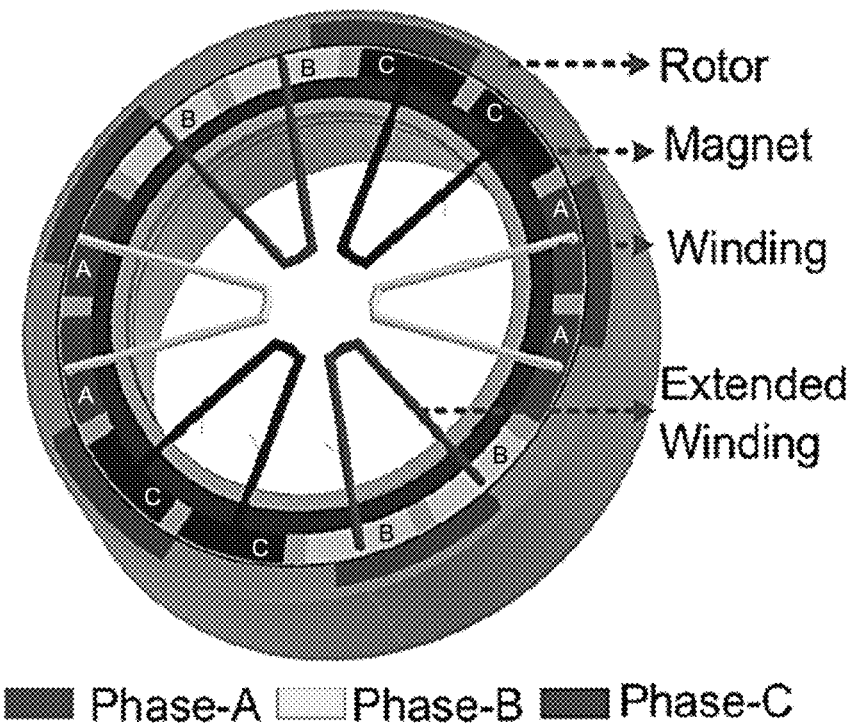

Referring to FIG. 1A, shown is a cross-sectional view illustrating an example of an outer rotor radial flux machine. A 3D FEA model of an outer rotor slotless radial flux machine with extended end-winding is shown in FIG. 1B. The slotless radial flux machine comprises a slotless stator and an outer rotor in a Halbach configuration. The end-winding region and the end-plate region are electromagnetically inactive and unused. However, the induced phase voltage and electromagnetic torque for a radial flux machine can be expressed as:

$$E_{rad} = \pi^2 k_w N_{ph} B_g (r_o - r_i) L f / \sqrt{2} \qquad (1)$$

$$T_{rad} = 3E_{rad} I / \omega_m = 4 N_{ph} k_w (r_o - r_i) L B_g A, \text{ and}$$

$$r_i = MT - L_g/2 \qquad (2)$$

where $r_o$, MT, $L_g$, $B_g$, L, $k_w$, A, I, $N_{ph}$, $\omega_m$, f are outer radius, magnet thickness, airgap thickness, airgap flux density, active length, winding factor, electric loading, phase current, series turns per phase, mechanical speed, electrical frequency, respectively. As is visible, the active length (common length of stator and rotor) of a radial flux machine produces torque whereas the end turns in two sides are only responsible for conductor continuity which contributes to conductor loss. Additionally, a substantial volume inside the frame is needed to fit the end turn. Therefore, if the available end turn region can be used to produce torque, it is possible to substantially improve the torque density of the machine. For an inner rotor concept, the end-winding can only be placed in the axial direction. However, for an inner stator concept, the winding can complete the loop near the shaft area to utilize the most from the coil. Hence, the unused regions can be converted into active torque producing segments. In this new design, the end turn can be extended in a triangular fashion in the radial direction with a significantly shorter end turn near the shaft region. The resulting structure of a 3D-airgap machine resembles a combined configuration of a radial flux and axial flux machine.

Figure 2:
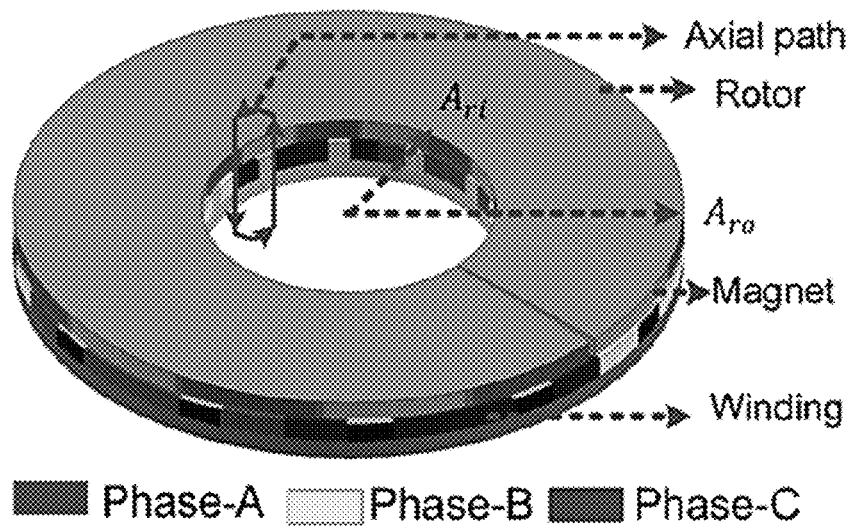
FIG. 2 illustrates an example of a 3D FEA model of a slotless axial flux machine, in accordance with various embodiments of the present disclosure.

The axial flux machines are pancake-shaped where the axial length is small compared to the outer diameter. The flux paths for these machines are in the axial direction. FIG. 2 illustrates an example of a slotless axial flux machine. It has a slotless stator, axially magnetized magnet pole in the rotor, and lamination both in stator and rotor to close the flux path. The electromagnetic torque produced in an axial flux machine can be expressed as:

$$T_{axial} = 4 N_{ph} k_w (A_{ro}^2 - A_{ri}^2) B_{g\alpha} A_\alpha, \qquad (3)$$

where $A_{ro}^2$, $A_{ri}^2$, $B_{g\alpha}$, $A_\alpha$ are rotor outer diameter, rotor inner diameter, airgap flux density, electrical loading, respectively. The output torque increases quadratically with respect to the outer diameter. In a 3D-airgap machine, the axial flux component is basically recycling the structural components along with the end turn from the radial flux section. Hence, a volumetric integration can significantly boost the electromagnetic torque.

Figure 3A:
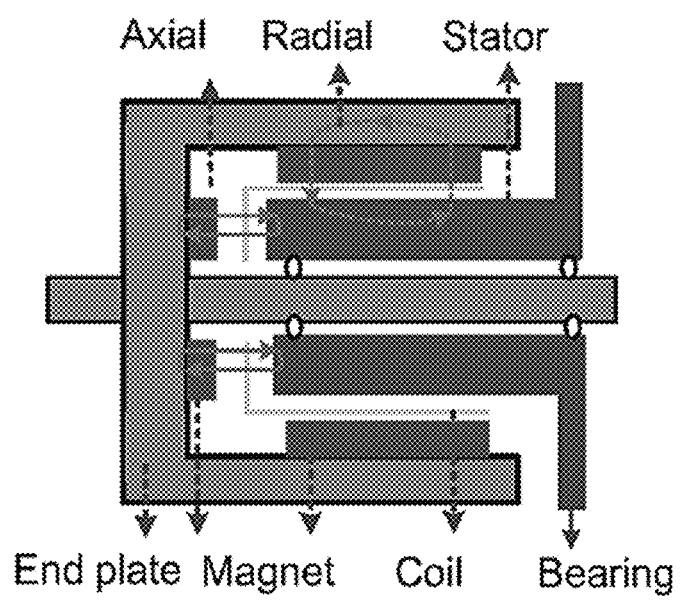
FIGS. 3A-3E illustrate examples of 3D-airgap machines, concept drawing, exploded view, and 3D FEA model in accordance with various embodiments of the present disclosure.
Figure 3B:
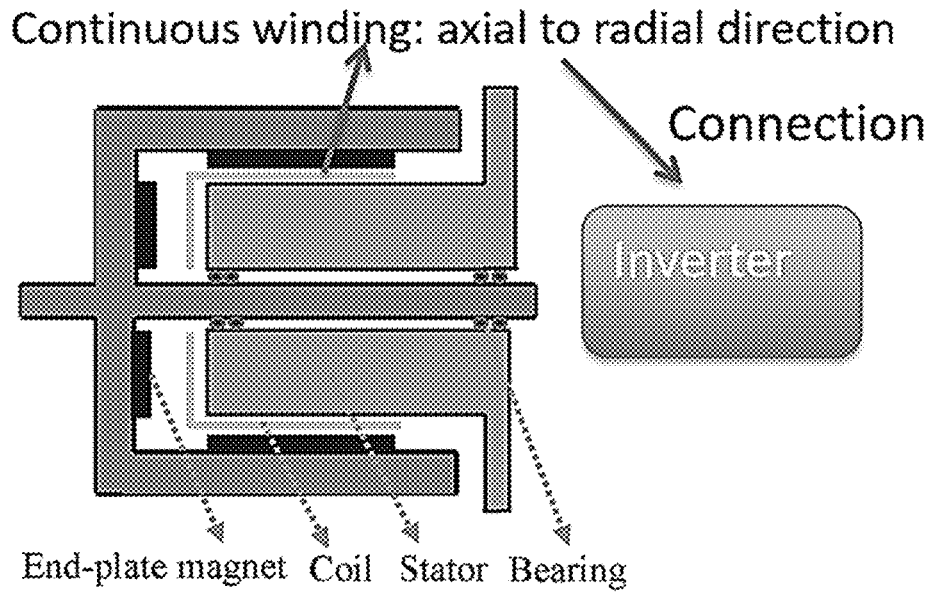
Figure 3C:
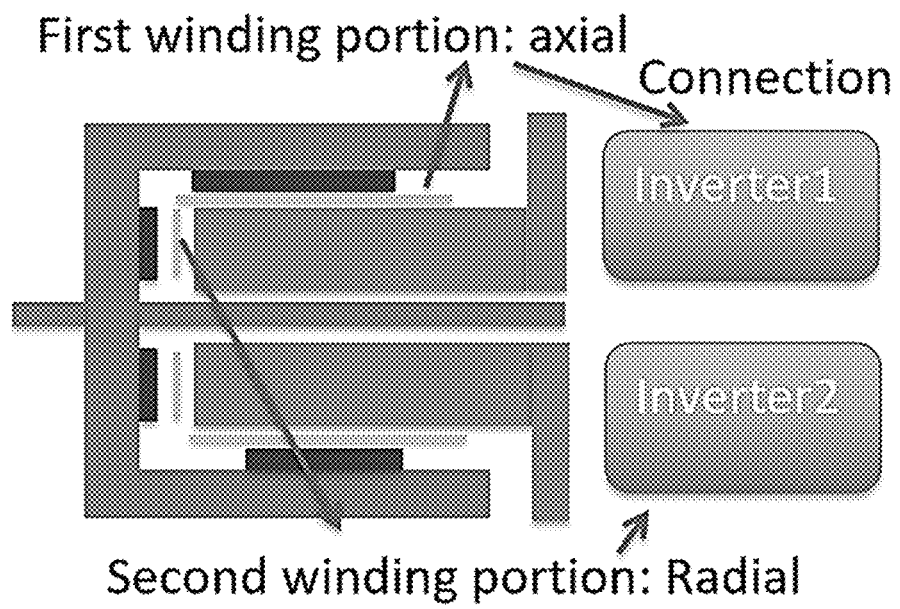

Referring to FIG. 3A, shown is an example of the proposed 3D-airgap machine. The proposed 3D-airgap machine is an electromagnetic and structural integration of both radial flux and axial flux machine with a new airgap structure which is continuous starting from radial direction and continues in the axial direction. In the 3D-airgap machine, airgaps for flux flow exist in both radial and axial directions with both the radial flux and axial flux machines developed within the same frame. Magnets can be placed in the endplate, acting as the rotor for the axial flux component. The magnetization can be oriented axially or in Halbach configuration. An axially laminated yoke with nonmagnetic teeth can be placed beneath the stator core of the radial flux machine. The axial flux path is in the orthogonal direction to the radial flux path as shown in FIG. 3A. FIGS. 3B and 3C illustrate two stator winding configurations for operation of the 3D-airgap machine. FIG. 3B shows a continuous winding configuration extending in both the axial and radial directions. Operation of the 3D-airgap machine can be controlled with a single inverter providing excitation to the winding. FIG. 3C shows a winding configuration including a first winding portion extending the axial direction and a second winding portion extending in the radial direction. Operation of the 3D-airgap machine can be controlled with two inverters providing dual excitation supplied to two winding portions.

Figure 3D:
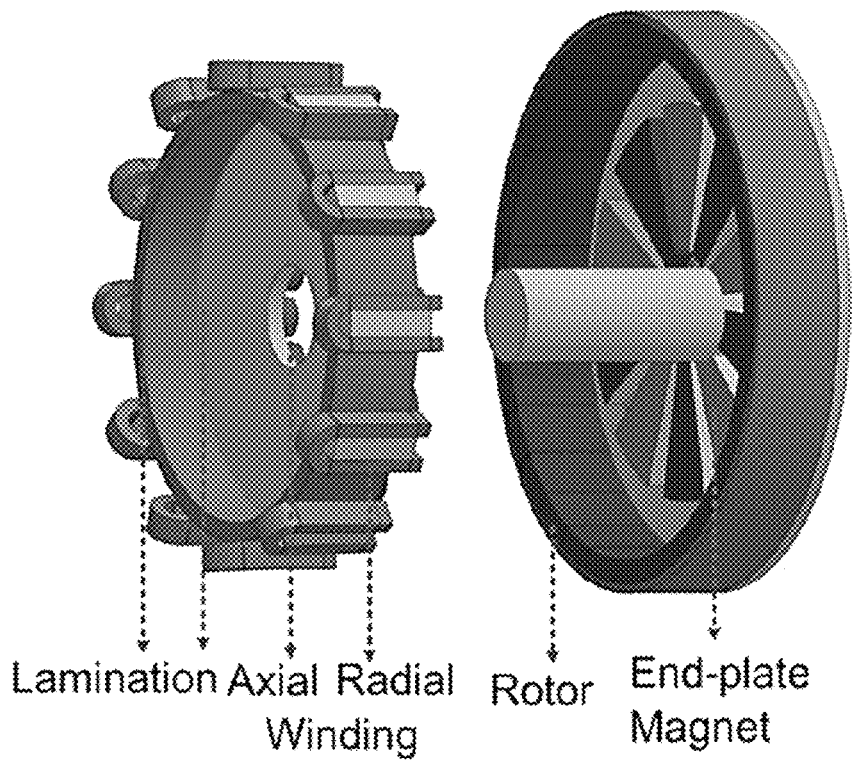
Figure 3E:
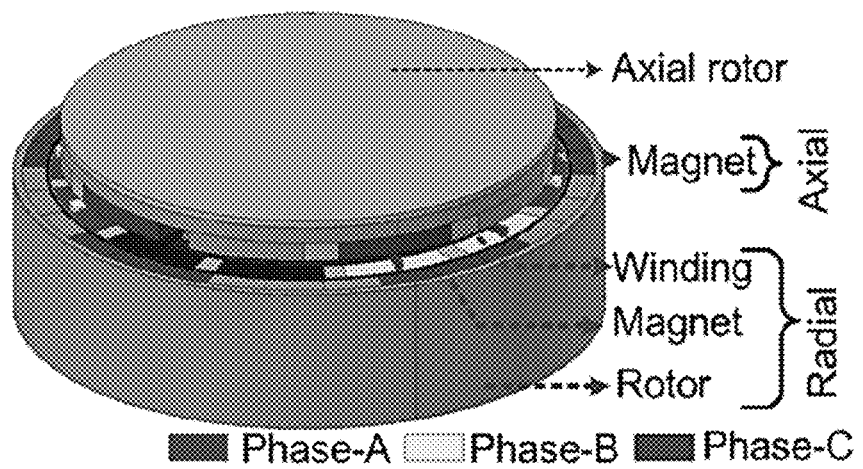

An exploded view of the 3D-airgap machine is presented in FIG. 3D. The axial flux machine's outer diameter can be adjusted such that the flux lines from the two machines do not interfere or overlap with each other, as presented in FIG. 3E. Otherwise, the interference of overlap may introduce unexpected harmonics in the torque. Moreover, the axial flux machine's inner diameter can also be optimized to circumvent the generation of eddy current in the shaft and resulting bearing current. Given that the flux loops from the radial and axial components do not interfere with each other, the electromagnetic torque from the 3D-airgap machine can be expressed as:

$$T_{3D}=T_{rad}+T_{axial}=4N_{ph}k_w[(r_o-r_i)LB_gA+(A_{ro}^2-A_{ri}^2)B_{g\alpha}A_\alpha]. \quad (4)$$

The torque of the 3D-airgap machine is the summation of that of the radial and axial machine. Therefore, the 3D-airgap slotless machine can substantially increase the torque density within the same frame size.

3D Finite Element Analysis

A radial flux machine with a slotless stator and Halbach rotor was designed using 3D FEA following the specifications in the table of FIG. 4A. A 12-slot/10-pole machine with single-layer concentrated winding was considered to validate the concept, but note that any feasible slot/pole and winding configurations can be applied to the concept. A rated speed of 5,000 r/min was considered.

Figure 4B:
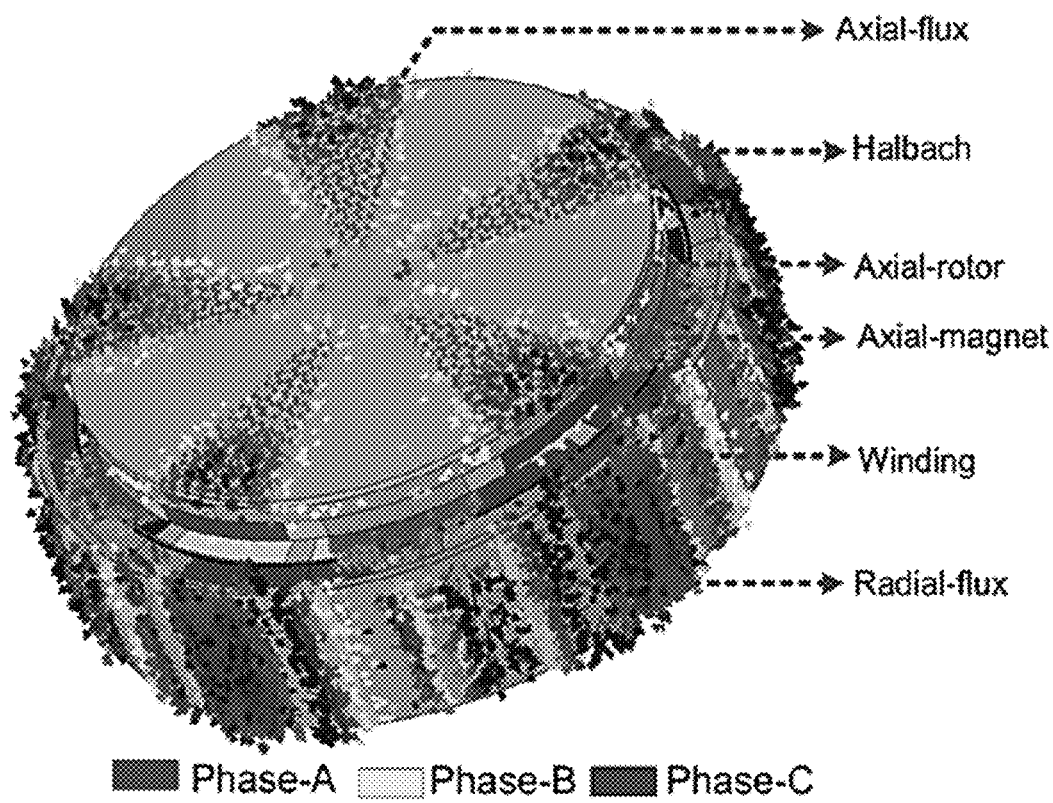
FIGS. 4B and 4C illustrate an example of flux path and flux density distribution for the 3D-airgap machine, in accordance with various embodiments of the present disclosure.
Figure 4C:
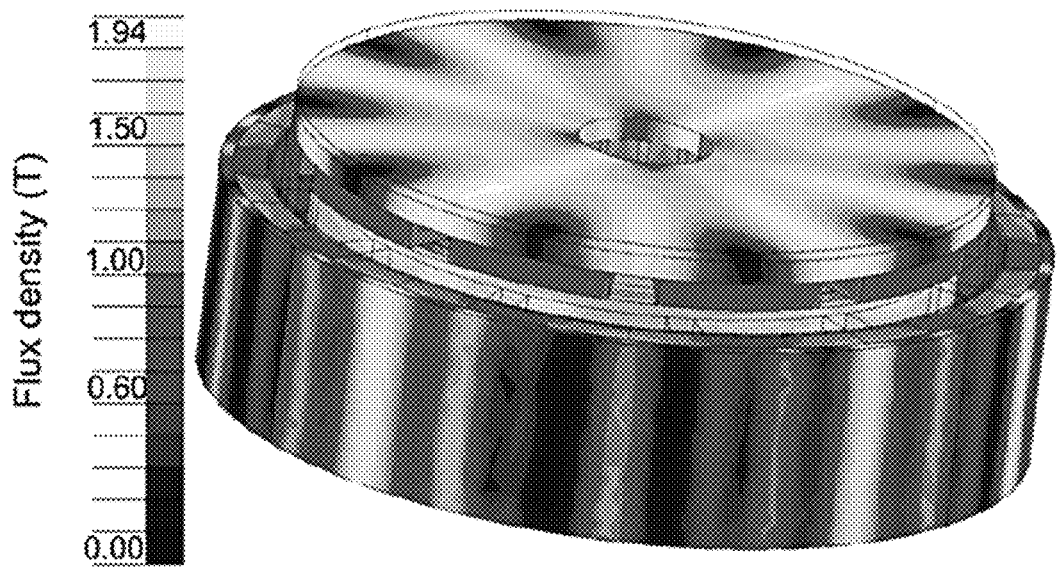

The radial flux machine (Design-I: 2D-airgap machine) was optimized to maximize the torque while minimizing the core material to improve the power density (kW/kg) of the machine. The constraints and performances are presented in the table of FIG. 4A. The current density was maintained to be less than 10 A/mm² to keep the conductor loss within the limit. Accordingly, the axial component was built on the rotor endplate of the optimized 2D-airgap machine to develop the proposed 3D-airgap machine (Design-II). Examples of the flux paths of the 3D-airgap machine and flux density distribution are shown in FIGS. 4B and 4C, respectively. It can be seen that both axial flux paths and radial flux paths co-exist in the same machine without interfering with each other.

Figure 5A:
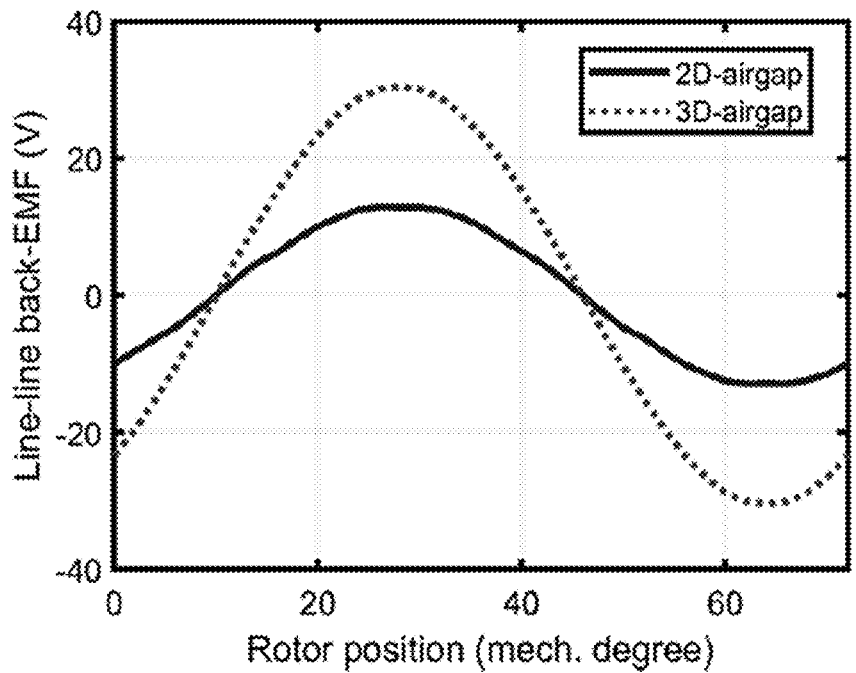
FIGS. 5A and 5B illustrate examples of 3D FEA extracted back-EMF for both 2D-airgap and 3D-airgap machines at 5,000 r/min, in accordance with various embodiments of the present disclosure.
Figure 5B:
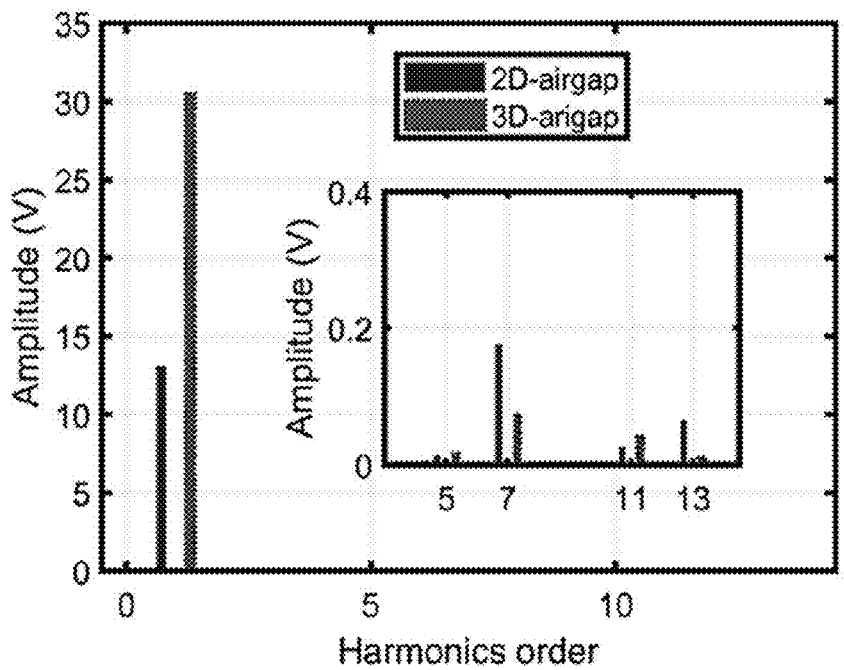

Comparison of Performances. The 3D FEA extracted back-EMF of both the 2D-airgap and 3D-airgap machines are presented in FIG. 5A. As can be seen, the 3D-airgap machine can substantially increase the back-EMF due to the efficient utilization of the end turn region. As a result, it is expected that significantly higher torque can be produced within the frame size. The back-EMF harmonics spectrum is presented in FIG. 5B for both 2D- and 3D-airgap machines. The back-EMF of both machines (2D-airgap on left and 3D-airgap on right) have negligible and substantially identical harmonic contents. It can be said that the radial and axial flux machines can co-exist within the same structure without interfering with each other.

Figure 6:
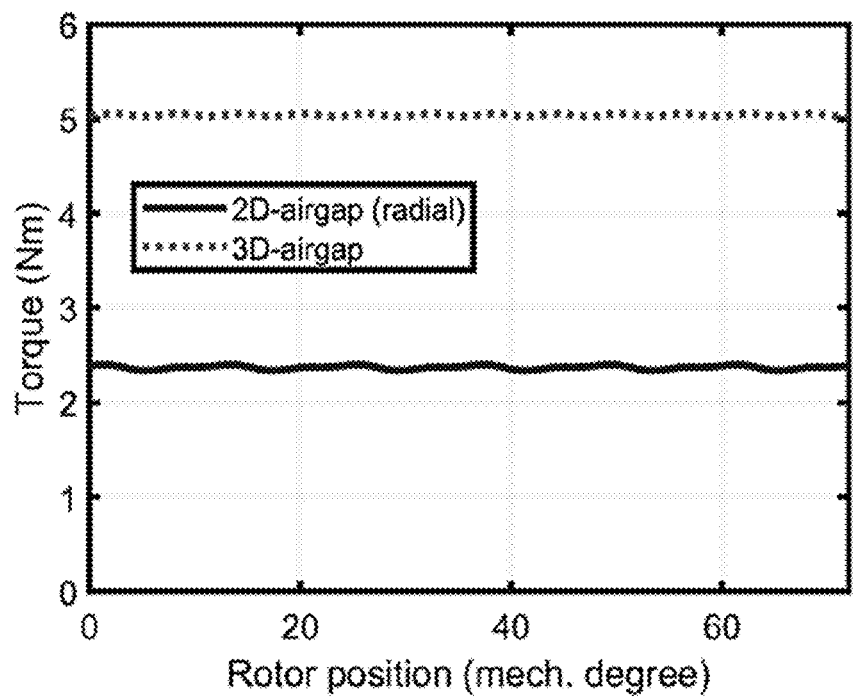
FIG. 6 illustrates an example of 3D FEA extracted torque for both 2D-airgap and 3D-airgap machines using $i_d=0$ control, in accordance with various embodiments of the present disclosure.

The 3D FEA extracted torque using $i_q=I_{peak}$ for both the 2D-airgap and 3D-airgap machines is presented in FIG. 6. The magnets in both radial-plate and endplate are on the surface of a rotor. As a result, the output torque is maximum for $i_d=0$ control. The output torque of the 3D-airgap machine increases by approximately 110% compared to that of the 2D-airgap machine. Torque ripple for both the machines are small as negligible harmonics are present in the back-EMF due to the slotless stator. Detailed performances are summarized in the table of FIG. 4A. It should be pointed out that the 3D-airgap machine uses a higher dc-link voltage to support the increased back-EMF.

The increased torque density in the 3D-airgap machine comes at the expense of higher conductor loss. The dc-conductor loss can be calculated as follows:

$$P_{dc}=3I_{rms}^2R_{dc}, R_{dc}=\rho lN^2 2Q/A_{slot}k_f m), \quad (5)$$

where $\rho$ is the resistivity, N is the number of conductors in each side of the coil, Q is slot number, $A_{slot}$ is available slot area, $k_f$ is the slot fill factor, m is the phase number, and l is the total conductor length. The 3D-airgap machine increases the torque per unit dc-conductor loss (Nm/W) by 70% compared to that of a 2D-airgap machine. The machine can also be designed such that for the same temperature rise, the 3D-airgap machine will have a higher output torque. At the same time, the torque per unit mass (Nm/kg) is substantially increased compared to that of the 2D-airgap machine. The other associated loss components that were evaluated for comparison are ac conductor loss, core loss, and magnet loss. The slotless machines are prone to ac conductor loss; hence, to keep the ac losses at the negligible level, the conductor size is kept substantially lower than the skin depth. The core loss is predicted using the loss surface (LS) model following the method presented in "Asymmetric bar winding for high-speed traction electric machines" by M. S. Islam et al. (*IEEE Transactions on Transportation Electrification*, vol. 6, no. 1, pp. 3-15, 2020), which is hereby incorporated by reference in its entirety. The efficiency can be calculated from the following:

$$\eta = \frac{P_{out}}{P_{out}+P_{dc}+P_{core}}, \quad (6)$$

where $P_{out}$ is the output power. Generally, to increase the torque density, the efficiency of electric machines goes down. Although the 3D-airgap machine has higher torque density compared to that of the 2D-airgap machine, an improvement in efficiency is found as presented in the table of FIG. 4A.

A comparable analysis was done by designing an equivalent radial flux machine to produce the same torque as that of the 3D-airgap machine (Design-III in the table of FIG. 4A). Design-III has the same geometrical parameters as that of Design-I, except that the stack length is increased to match the electromagnetic torque of the 3D-airgap machine. Accordingly, the power density of the 3D-airgap machine in terms of kW/kg and kW/liter is compared against both Design-I and Design-III to have a fair comparison. It can be seen that the 3D-airgap machine has the highest power density both in terms of kW/kg and kW/liter. The improvements in kW/kg against Design-I and Design-III are 60% and 40%, respectively. Additionally, the power density in terms of kW/liter also increased by 110% compared to Design-I and Design-II, considering the active volume.

Moreover, the 3D-airgap machine has 25% higher torque per unit dc-conductor loss compared to Design-III. Therefore, given the associated conductor loss, the 3D-airgap machine can substantially increase the torque density without increasing the thermal burden on the machine. These improvements may be attributed to the efficient utilization of the end-winding and conversion of structural components into torque producing components. This analysis suggests the superiority of the disclosed 3D-airgap machine over the conventional 2D-airgap machine for the same active volume in terms of power density and efficiency.

Simulation Method of the 3D-Airgap Machine. The complex structure without axial symmetry in the 3D-airgap machine requires high computational memory for 3D FEA. Hence, to reduce the computational burden, two machines can be separately simulated; one radial flux machine (2D-airgap machine) and one axial flux machine. Then, the performance of the 3D-airgap machine can be predicted using the superposition principle as:

$$T_{3D} = T_{radial} + T_{axial} \quad (7)$$

Figure 7:
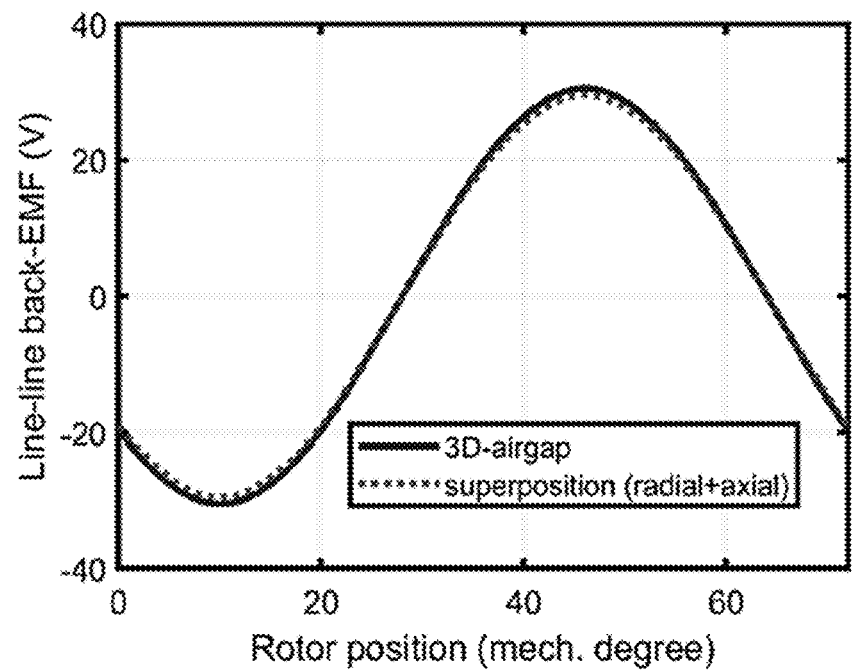
FIG. 7 illustrates validation of superposition principle for the back-EMF of the 3D-airgap machine, in accordance with various embodiments of the present disclosure.
Figure 8A:
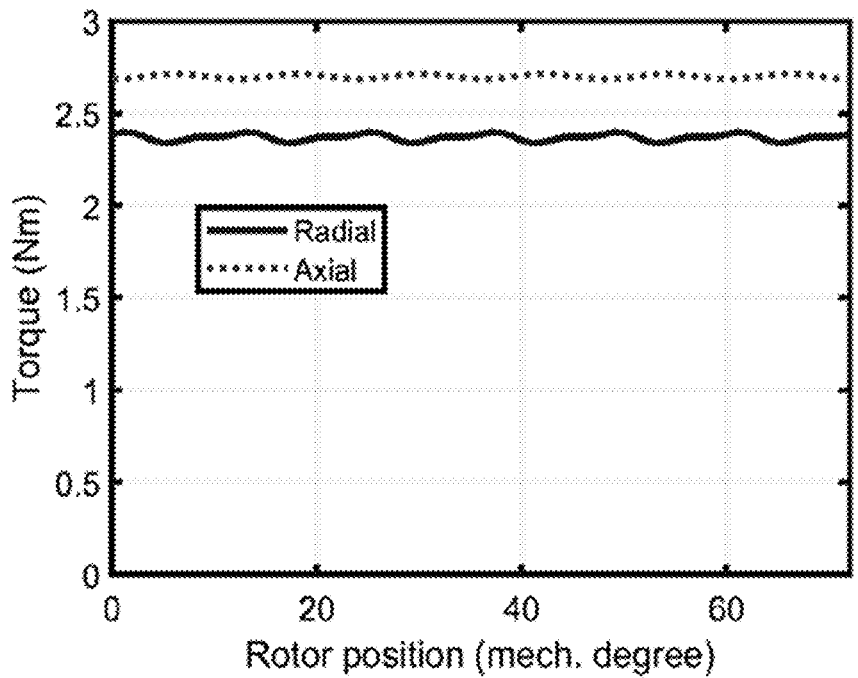
FIGS. 8A and 8B illustrate examples of torque using $i_d=0$ control from 3D FEA simulations and validation of superposition method, in accordance with various embodiments of the present disclosure.
Figure 8B:
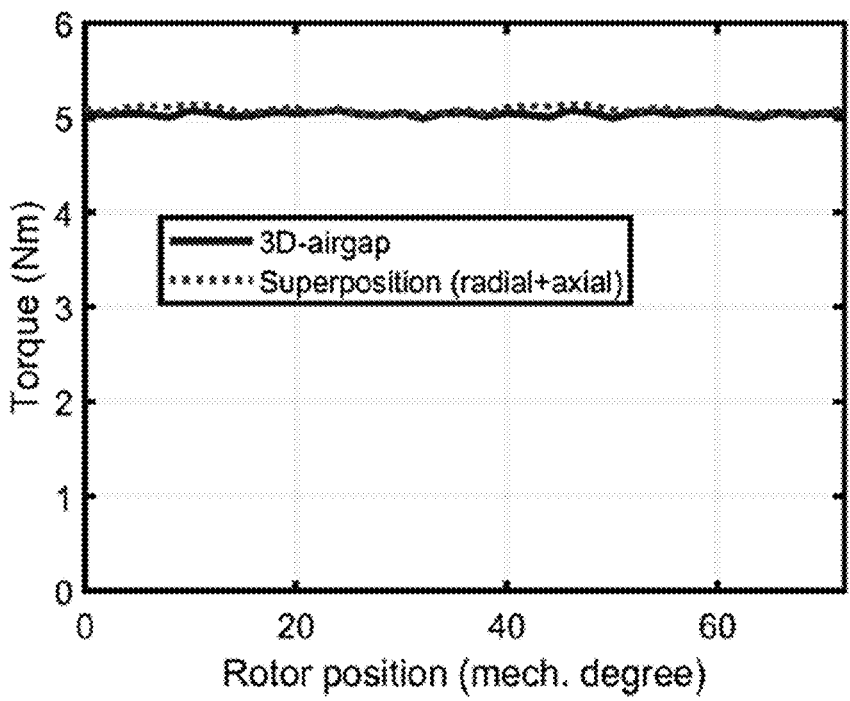

Since the two flux loops in the integrated 3D-airgap design do not overlap, the result from the 2D FEA will match that from 3D FEA with the superposition approach. The separately simulated back-EMFs of radial flux and axial flux machines using 3D FEA are used to predict the output back-EMF of the superposition principle. The output of the superposition principle is compared to the back-EMF of the 3D-airgap machine. FIG. 7 illustrates the validation of the superposition principle for the back-EMF. It is visible that the two back-EMFs match very well. Additionally, the 3D FEA extracted torque profiles in both radial and axial flux machines are presented in FIG. 8A. The torque profile of the 3D-airgap machine is compared with the torque output from Equation (7) to validate the simulation method and presented in FIG. 8B. The two torque outputs match very well. The peak-to-peak torque ripple from the superposition method is 0.10 Nm compared to 0.08 Nm of the 3D-airgap machine. Hence, it can be said that even though the 3D-airgap machine has a complex structure, the simulation method shown in this section will substantially reduce the computational time.

Challenges of the 3D-Airgap Machine. The unique structural integration of the radial and axial machines to create the 3D-airgap machine has some challenges. The challenges of this topology can be summarized as follows:
Generally, the axial flux machines have higher axial force which increases the risk of rotor eccentricity. However, the adoption of the slotless structure along with a larger physical airgap will sufficiently reduce the risk of rotor eccentricity.

Integration of the axial flux machine in the endplate has mechanical challenges. This can be solved using structural FEA analysis with an optimized back-plate on the rotor and a smaller ratio of axial length to diameter.

Even though the 3D-airgap machine has the structural integration challenge, the advantages in terms of power density and efficiency outweigh the challenges and drawbacks.

Low Thermal Resistance Cooling System for Slotless Machine

Figures 9A, 9B:
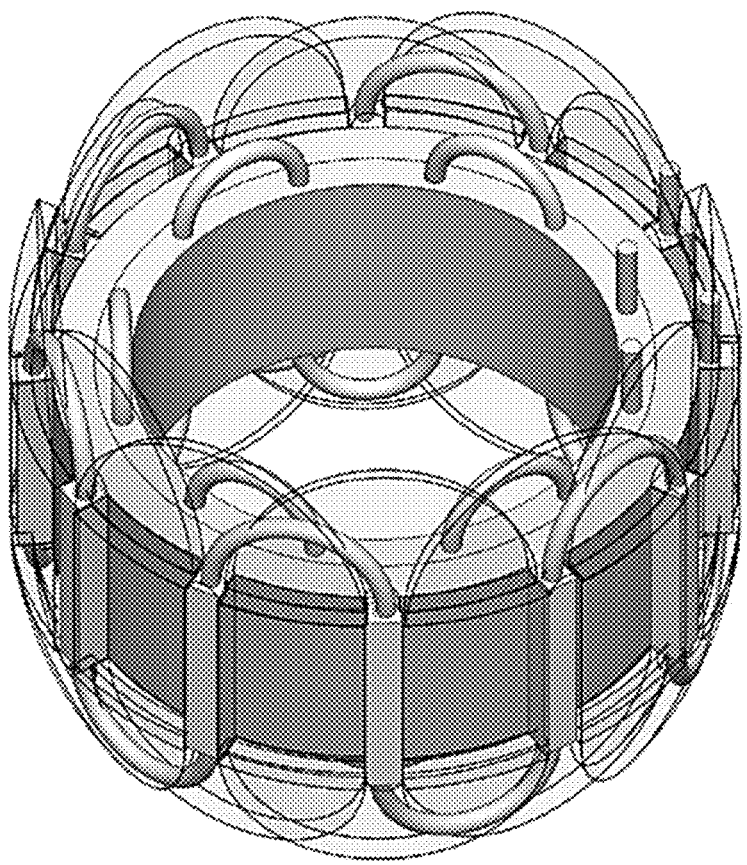
FIGS. 9A-9C illustrate an example of an airgap machine design with winding embedded liquid cooling (WELC), in accordance with various embodiments of the present disclosure.
Figure 9C:
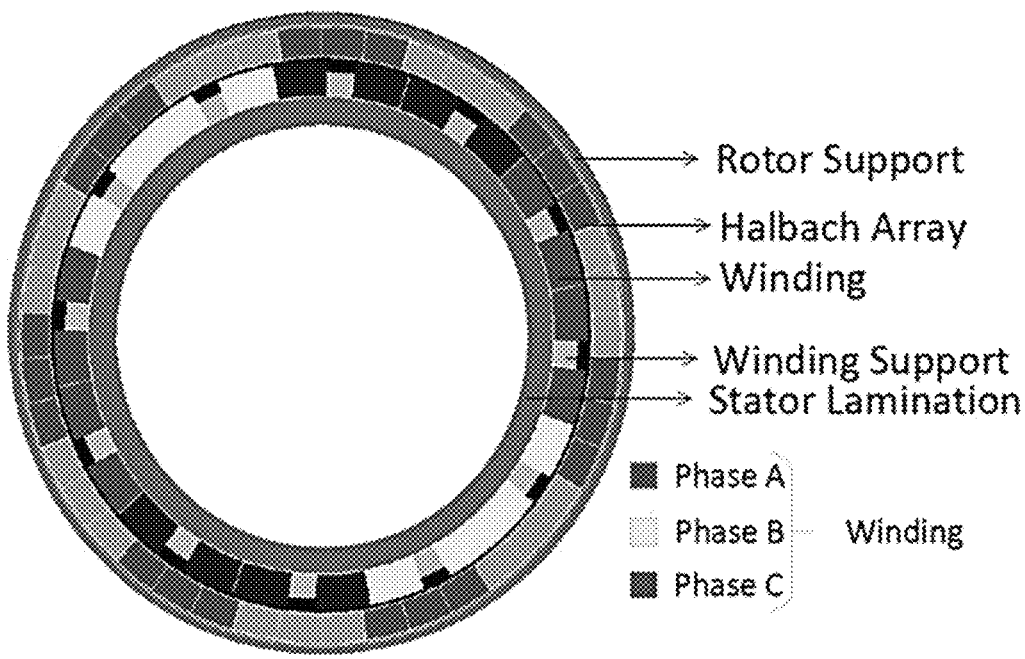

A 120 kW slotless machine was considered to demonstrate the novel thermal management concept. The outer diameter and stack length of the machine design, which is shown in the table of FIG. 9A, were selected to meet the US DoE 2025 research goal of 50 kW/liter. The base speed of the machine is 10,000 r/min. A 12-slot/14-pole configuration is considered due to its high winding factor (0.933) and lower ripple harmonics. It also supports both single-layer and double-layer concentrated winding configurations. A double layer winding was selected due to its reduced end-turn length. The windings can be wound around thermal plastic support structures in place of conventional laminated teeth as illustrated in the perspective view of FIG. 9B. The rotor can have magnets in a Halbach configuration comprising three segments per pole to circumvent the need for rotor core. A non-magnetic rotor support is used to hold the magnet as shown in FIG. 9C. The coreless rotor minimizes the magnet loss and has zero rotor core loss. This helps to simplify the thermal management for the rotor. The considered machine is optimized to maximize the torque density and minimize the total loss while maintaining the parameters within the constraints given in the table of FIG. 9A.

Figure 10A:
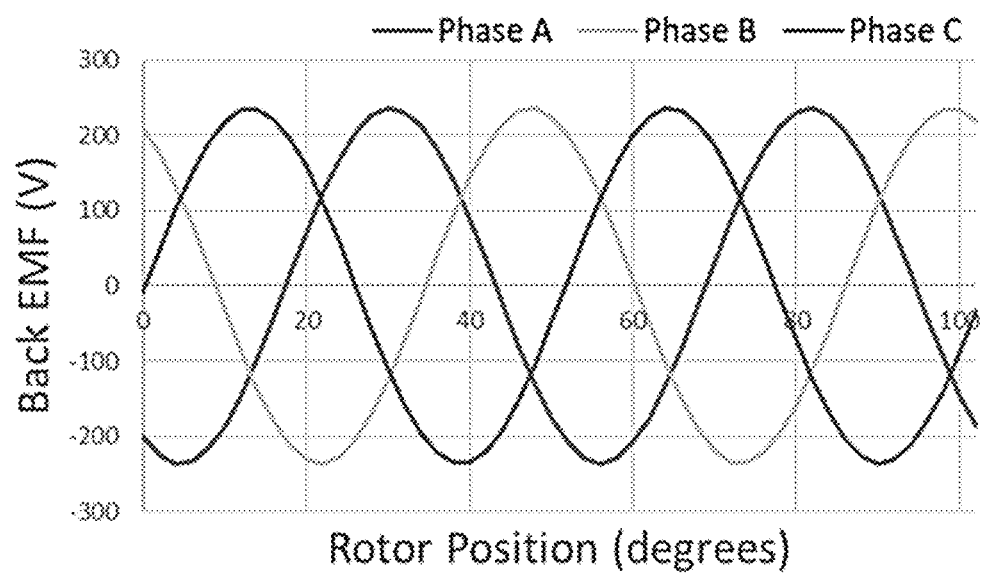
FIGS. 10A-10C illustrate examples of back EMF, torque and loss data of the airgap machine, in accordance with various embodiments of the present disclosure.
Figures 10B, 10C:
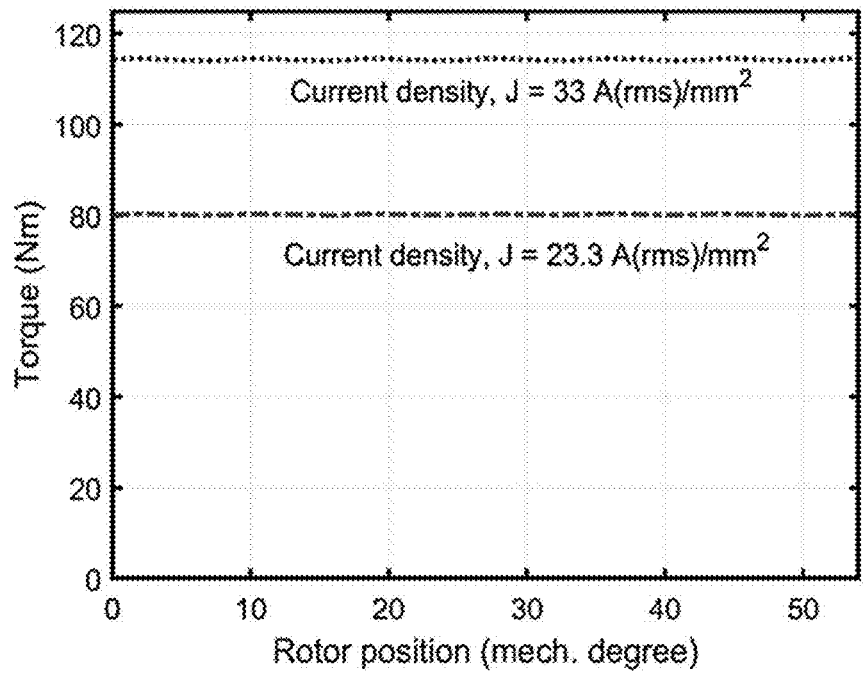

Optimization was carried out to give the best platform for the proposed thermal concept evaluation. The simulated back-EMF and torque profile are shown in FIGS. 10A and 10B, respectively. The loss data obtained using the FEA method are presented in the table of FIG. 10C. Different losses (dc-conductor loss, ac-conductor loss, and core loss) were extracted following the FEA-based approach presented in "Slotless lightweight motor for aerial applications" by M. S. Islam et al. (*IEEE Transactions on Industry Applications*, vol. 55, no. 6, pp. 5789-5799, November 2019), which is hereby incorporated by reference in its entirety.

Figures 11A, 11B:
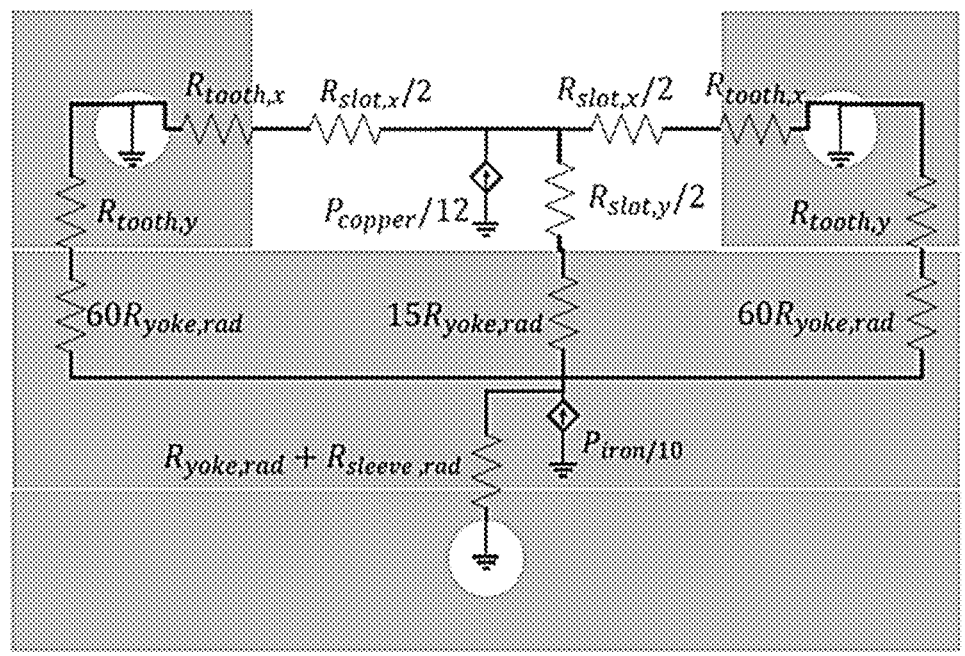
FIGS. 11A and 11B illustrate an example of a lumped parameter thermal network of a WELC system and machine materials, in accordance with various embodiments of the present disclosure.

The WELC can be utilized in the 2D-airgap machines such as those previously described. A 2D-airgap machine can comprise non-magnetic winding support or teeth to hold the stator winding. Since the winding supports/teeth of a slotless motor are non-magnetic, a thermal plastic material (e.g., Celanese Coolpoly® D5506) with integrated cooling channel was used as the winding support in the stator. The thermal plastic is an electrical insulator and thermally conducting. It is also easily moldable to a desired shape. This helps to introduce cooling channels through the winding support. The winding support can comprise fin-like structures to increase the contact surface with the windings. The coolant tubes and their placement with respect to the heat sources are shown in FIG. 9B. Circulating the coolant in close proximity to the heat source substantially improves the thermal performance of a slotless machine. Channels can be positioned in a way so that it does not decrease the fill factor of the winding. Additionally, another structure made of aluminum can be designed to provide a second path for the coolant flow just beneath the stator back-iron/yoke. This second path helps to extract the heat from the motor laminations. In the proposed design, two parallel paths were provided for heat extraction out of the machine as presented in the schematic diagram of FIG. 11A. The rotor was not considered for the thermal analysis since the rotor in this design has trivial losses and the heat flow from the stator to rotor is negligible due to the high thermal resistance across the airgap.

Thermal Analysis

Lumped Parameter Thermal Network. Thermal paths in the stator were analyzed using the lumped parameter thermal network (LPTN) model shown in FIG. 11A. For the LPTN analysis, a section of the stator comprising one slot and two winding supports along with the corresponding section of the stator core was considered. The center of the winding supports and the center of the aluminum water jacket is assumed to be at the temperature of the coolant. Heat flow in the axial direction and across the air gap was neglected as the thermal resistance to ambient is considerably higher in those paths. The materials used in the construction of the slotless motor is presented in the table of FIG. 11B.

The equivalent thermal conductivity of the slot material is given by:

$$k_{slot} = 0.2749[(1-F)A_{slot}L_{core}]^{-0.44771} \quad (8)$$

where F is the fill factor of the winding, $A_{slot}$ is the area of the slot and $L_{core}$ is the stack length of the stator core lamination. The general form of conductive thermal resistance in the lumped parameter network is given by:

$$R_{th} = \frac{L}{\lambda A} \quad (9)$$

where L is the length of the component along the direction of heat flow, $\lambda$ is the thermal conductivity of the material, and A is the area of cross section of the component normal to the direction of heat flow. The radial thermal resistance of the stator yoke can be calculated using:

$$R_{yoke,rad} = \frac{1}{2\pi L_{core}\lambda_{lam}} \ln\left(\frac{r_o}{r_i}\right) \quad (10)$$

where $\lambda_{lam}$ is the thermal conductivity of the lamination, and $r_o$ and $r_i$ are the outer and inner radius of the stator yoke, respectively. The thermal resistance of the portion of the yoke connected to the winding supports and slot can then be calculated using:

$$R_{yoke,\theta} = \frac{2\pi}{\theta} R_{yoke,rad} \quad (11)$$

where $\theta$ is the angle of the arc of the winding support or slot. The radial thermal resistance of the aluminum sleeve and slot can also be calculated in the same fashion. The copper loss assigned to the slot node is the total copper loss of the machine divided by the number of slots, and the core loss assigned to the yoke node is $(\theta/2\pi)P_{core}$ where $\theta$ is the arc angle of the yoke considered in the LPTN and $P_{core}$ is the total core loss in the machine.

Figure 12A:
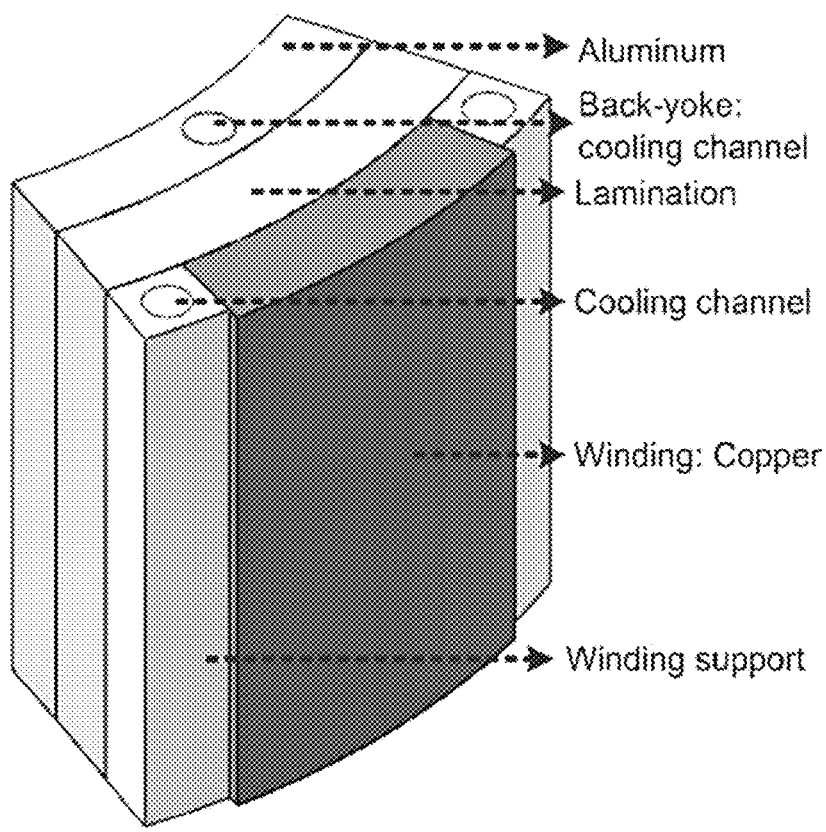
FIGS. 12A-12E illustrate examples of a computational fluid dynamics (CFD) model and temperature distributions and variation based upon the CFD model, in accordance with various embodiments of the present disclosure.

Computational Fluid Dynamics (CFD) Analysis. A CFD analysis was done with controlled flow rates ranging from 2-16 liter/minute to accurately determine the temperature distribution and temperature rise in different sections in the liquid-cooled stator. To reduce computational complexity, only a section of the stator having one slot and two winding supports and the portion of the stator yoke connected to these components was considered as presented in FIG. 12A. The copper and core losses were introduced in the simulation as the internal heat source of the winding and yoke, respectively. Moreover, to reduce the pressure drop or reduce the coolant path, four inlets and four outlets are used in this analysis. The considered coolant was a water-ethylene glycol (50-50%) mixture as this is the widely used coolant for traction applications. Even though the coolant sees the magnetic field variation, due to very low conductance the generated eddy current loss in the coolant is negligible.

Figure 12B:
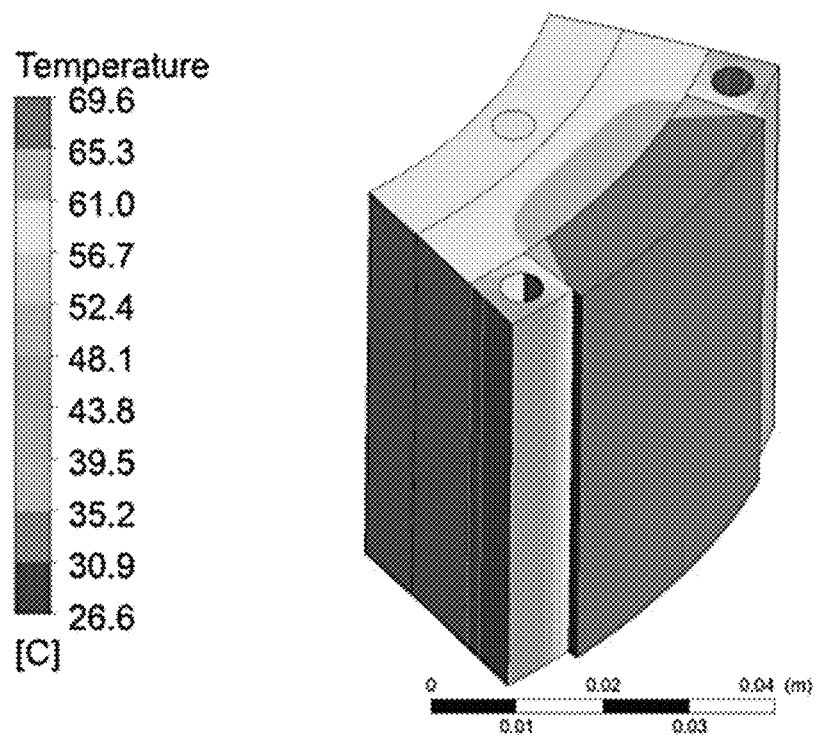
Figure 12C:
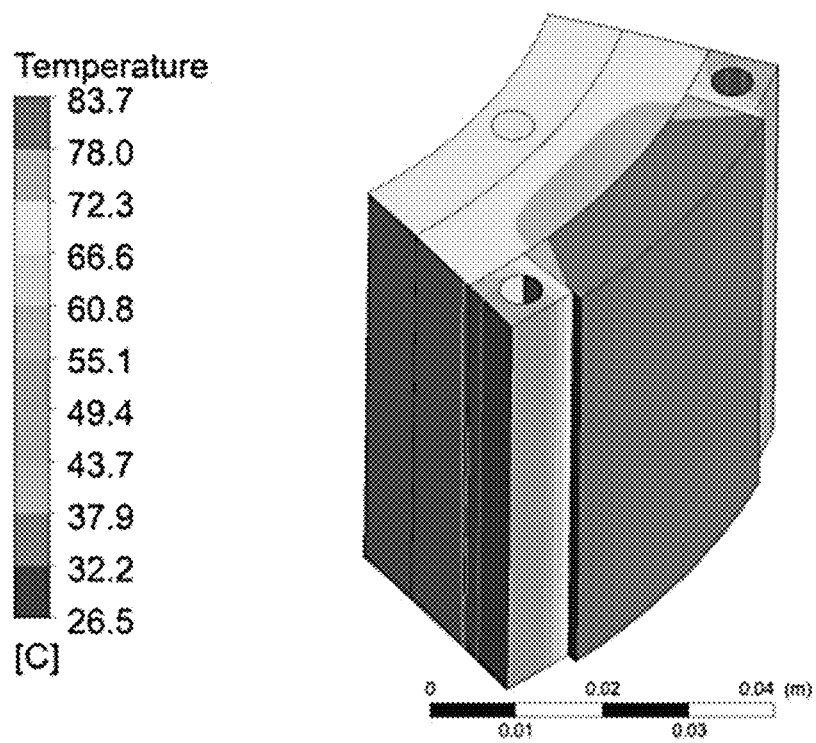
Figure 12D:
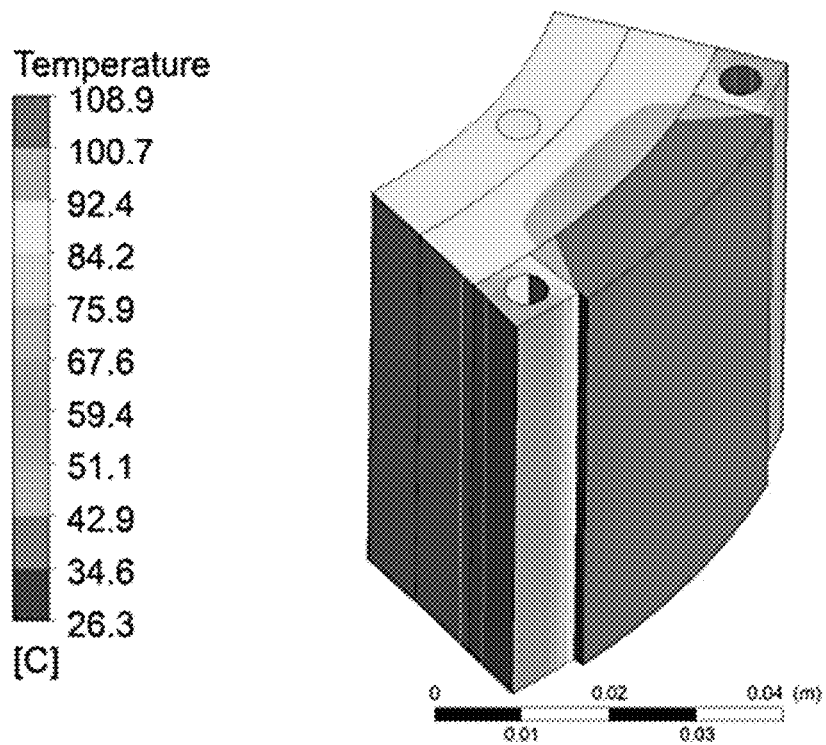
Figures 12E, 13A:
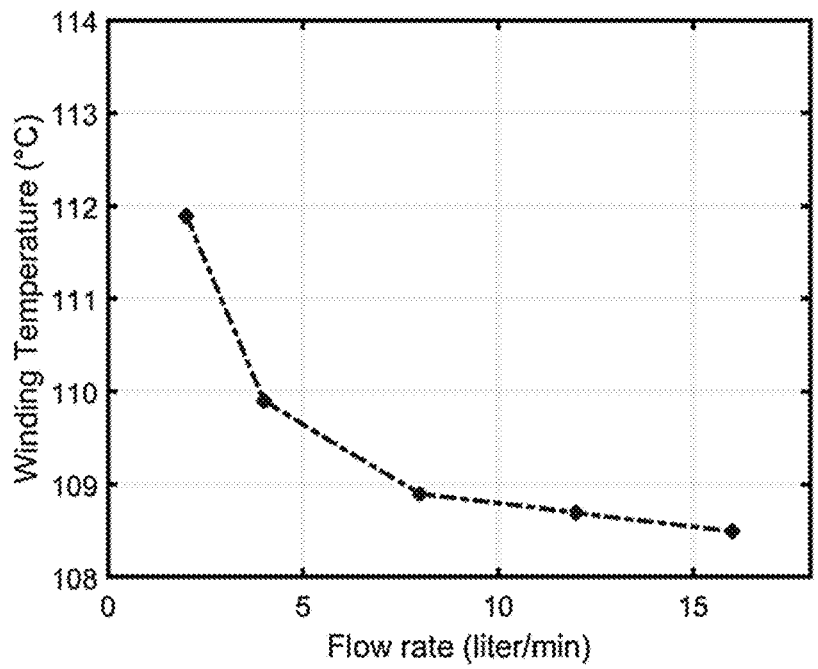
FIGS. 13A-13D illustrate examples of temperature variations, in accordance with various embodiments of the present disclosure.

CFD simulations are performed for different load conditions to demonstrate the effectiveness of the cooling mechanism. FIGS. 12B-12D show the temperature distribution for different current densities at a coolant flow rate of 8 liter/minute for the full motor. This flow rate was selected as the optimum value since a further increase in the flow rate does not result in a proportional reduction in temperature. FIG. 12E illustrates the variation of winding temperature with flow rate at J=23.30 A(rms)/mm². The temperature of the coolant at the inlet was assumed to be constant 27° C. (room temperature). The coolant flowed in two parallel paths: one through the winding support coolant channels and the other behind the yoke, with a flow rate of 6 liter/minute and 2 liter/minute, respectively. There are three inlets and three outlets for the winding support coolant channels, which result in a flow rate of 2 liter/minute per slot. This branching out of coolant flow in the winding support's coolant channels is done to minimize the pressure drop caused by the length of a single coolant channel. The winding support's coolant channels are in direct contact with the heat source; therefore, the total flow rate for these channels is higher compared to that of the axial channels. Moreover, the mechanical strength of D5506 is obviously lower than the aluminum, as a result the branching out maintains the structural integrity.

Thermal Simulation Results

The LPTN can be used to provide a quick estimate of temperatures at different locations in the motor for different slot current densities. These temperatures were then compared against the temperatures obtained from the CFD analysis to verify the validity of the LPTN model.

Temperature rise in different portions of the machine using both CFD and lumped parameter network are shown in the table of FIG. 13A. The CFD results match closely with that of the LPTN model and the continuous output power for this 120 kW slotless machine using the proposed WELC method is 85 kW when the temperature rise is limited to 80° C. This also corresponds to a current density of 23.3 A/mm². This validates that the proposed WELC method is effective to further increase the maximum allowable continuous current density compared to the state-of-the-art cooling methods, which makes it possible to improve the power density as well.

Figure 13B:
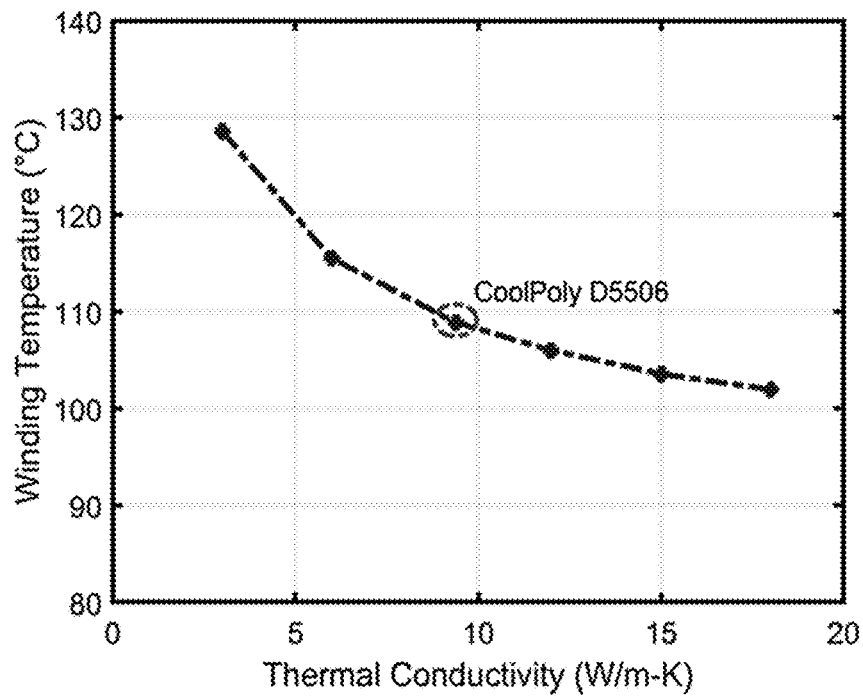

To analyze the effectiveness of thermal conductivity of the winding support material, the hotspot temperature of the winding was evaluated for different thermal conductivities ranging from 3 W/m-K (similar to Zirconia) to 18 W/m-K (similar to Silicon Nitride), as shown in FIG. 13B. It was found that the continuous current density can be increased using materials with higher thermal conductivity. It was also found that, the benefit of higher thermal conductivity saturates at higher values.

Transient Performance. The transient performance was evaluated for the peak operating condition by introducing thermal capacitances in the LPTN model. This model was verified using CFD analysis and was then used to predict thermal performance at peak output of 120 kW. The initial temperature was assumed to be 27° C. and the period of peak power operation was 18 seconds. Beyond 18 seconds, the output power is set for 85 kW continuous operation. Therefore, for the first 18 seconds, the load is at peak and after that, the load is reduced to the continuous load level. This situation may be considered a worst-case operation.

Figure 13C:
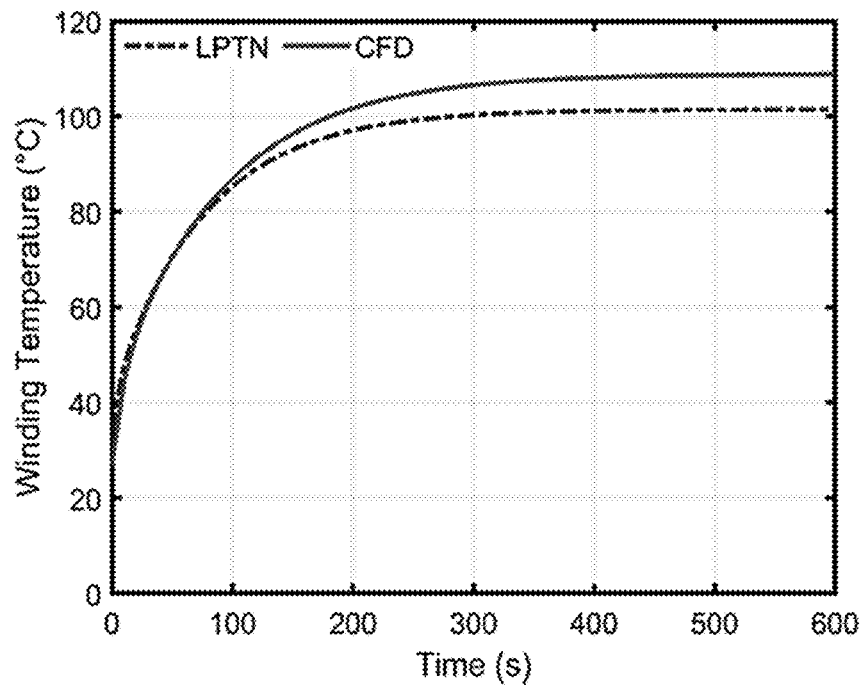
Figure 13D:
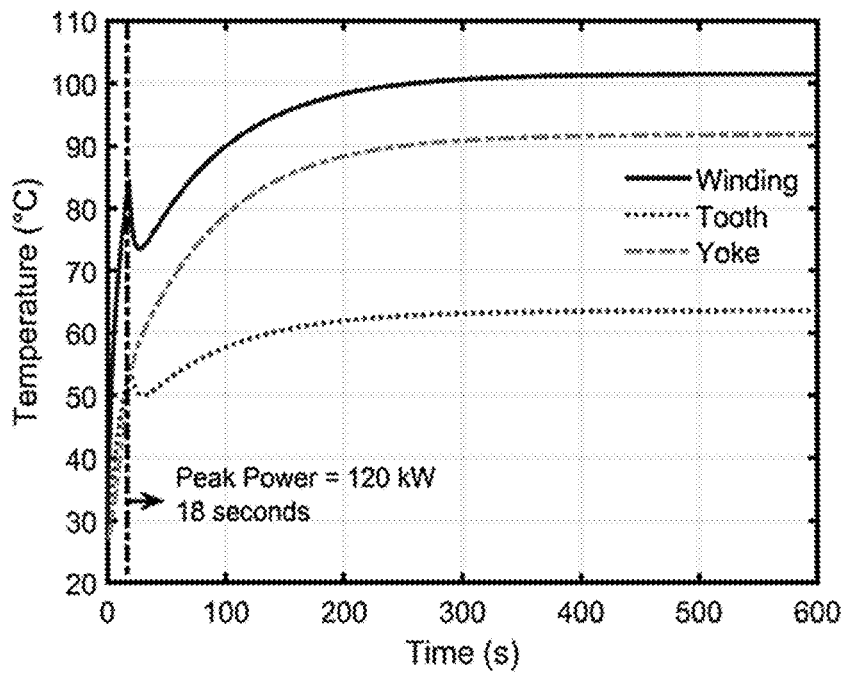

As seen in FIG. 13C, the temperature obtained from the LPTN simulation very closely matches the CFD results. Thus, the LPTN provides a quick and accurate estimation of temperature during the transient phase without having to perform time-stepping iterations of computationally intensive CFD. FIG. 13D shows the temperature rise during 18 seconds of rated peak operation followed by rated continuous operation using the LPTN model.

Figure 13E:
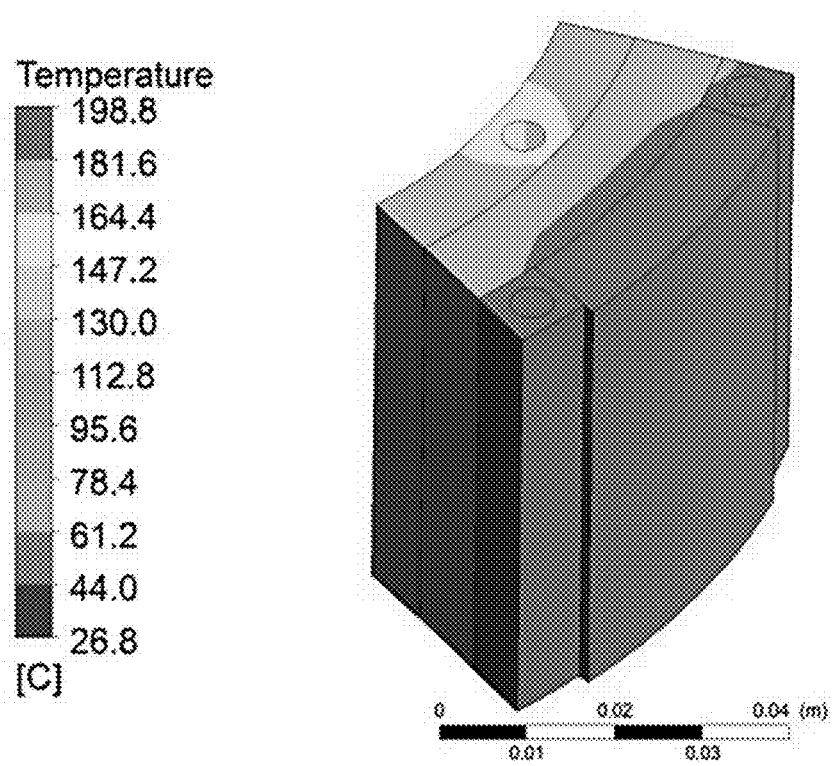
FIGS. 13E and 13F illustrate examples of temperature distribution, in accordance with various embodiments of the present disclosure.
Figure 13F:
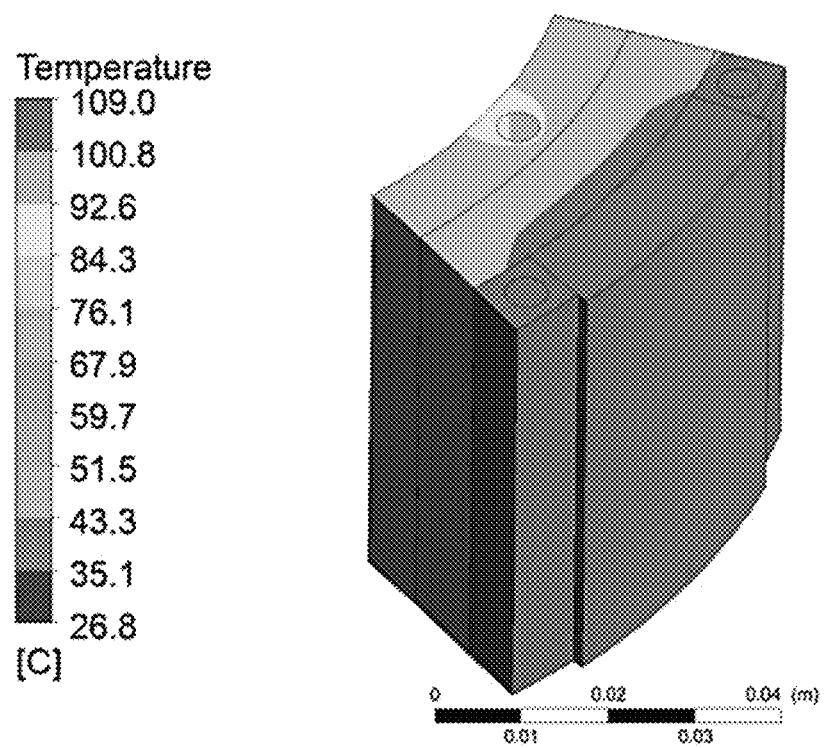

Comparison with Conventional Axial Water Jacket Cooling. In order to compare additional advantages offered by WELC, a single axial water jacket channel per slot was simulated using CFD with the same flow rate of 8 liter/min. The channels were removed from the winding supports and replaced with solid winding supports made of D5506 material. Similar to the proposed cooling method, the water jacket housing was made of aluminum with one axial channel per slot for a total of 12 channels. Since only one channel carries the coolant, the entire flow volume was through this channel, thus keeping the total flow rate the same as previously discussed. As presented in FIG. 13E, the maximum temperature is well above the permissible limits. Thus, the maximum allowable slot current density using axial water jacket cooling for the same temperature rise of 80° C., as seen in FIG. 13F, is 15.6 A/mm$^2$. This current density is 50% lower than that of the WELC concept.

In this disclosure, a novel 3D-airgap machine concept is presented that can increase the torque/power density of the conventional slotless radial flux machine (2D-airgap machine). The 3D-airgap machine converts the loss producing end-winding and structural endplate into torque producing components. This has been accomplished by electromagnetic and structural integration of axial and radial flux machines. The idea of the 3D-airgap machine is validated through 3D FEA. It has been shown that the 3D-airgap machine provides a significant improvement in torque density (110%) and torque per unit dc-conductor loss (70%) compared to the 2D-airgap machine without sacrificing efficiency. In comparison with an equivalent radial flux machine (Design-III of the table of FIG. 4A), the 3D-airgap machine has superior power density both in terms of kW/kg and kW/liter by 40% and 110%, respectively. The superiority of the 3D-airgap machine compared to the 2D-airgap machine makes this a viable solution for the electrified powertrain in transportation applications.

Additionally, a 2D FEA simulation method has been presented to predict the performances of the 3D-airgap machine using a superposition principle, which substantially reduces the computational time for the structurally complex 3D-airgap machine. It has been shown that the superposition principle predicts the performance within at least 98% accuracy compared to the direct 3D FEA simulation of the 3D-airgap machine.

A low thermal resistance winding embedded liquid cooling (WELC) concept is also disclosed for slotless motors leveraging the space within the non-magnetic winding support for efficient heat extraction out of the windings, and thereby achieving higher current densities. The developed thermal management method for slotless motor enables a lightweight design giving very high-power density at the system level. It has been shown that using the disclosed cooling method, a continuous current density of 23.3 A(rms)/mm$^2$ is possible. In comparison to an axial water jacket cooling, the proposed method enables 50% more continuous current density. This can result in a proportional increase in the power density as well. A LPTN model has also been developed for rapid estimation of the critical temperature rises at different locations of a slotless machine. The results of the LPTN model have been validated using CFD.

Figure 14A:
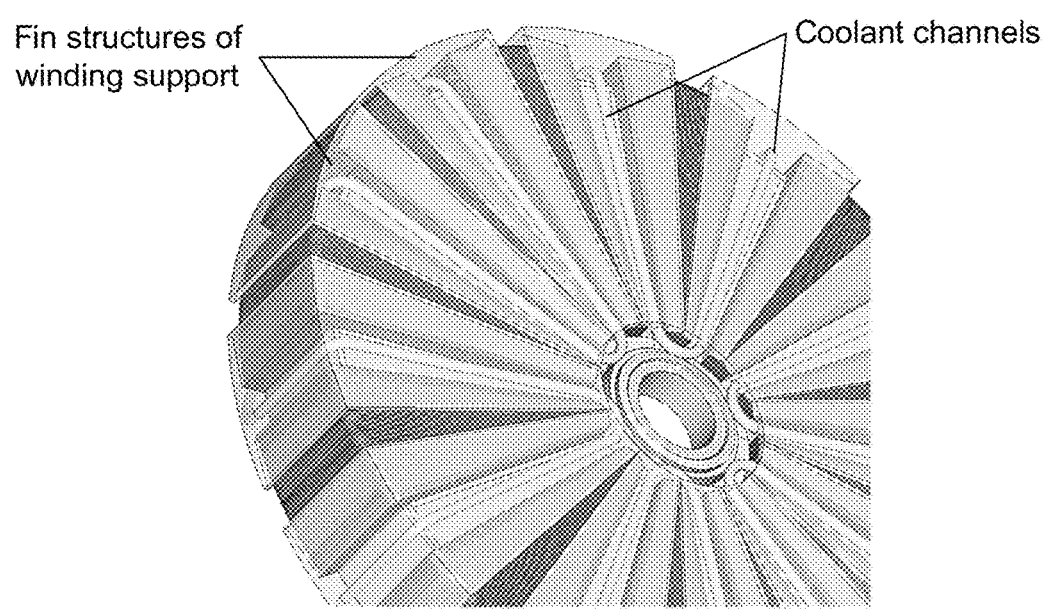
FIGS. 14A and 14B illustrate an example of a 3D-airgap machine design with WELC, in accordance with various embodiments of the present disclosure.

The WELC can be utilized in the 3D-airgap machines such as those previously described. A 3D-airgap machine can comprise non-magnetic winding support or teeth to hold the stator winding. The winding support holds both the radial and axial windings. For example, the winding support can comprise non-magnetic thermal plastic material. Typically, thermal plastic materials are electrical insulators and thermal conductors. The winding support can comprise fin-like structures to increase the contact surface with the windings. FIG. 14A shows the fin structures of the support structure extending between the windings. The support structure can extend along the radial side (endplate), over at least a portion of the axial windings, or both. Cooling channels can be introduced through the winding support. The cooling channels can extend through the outer end of the support structure as has been described. In some embodiments, the cooling channels can also extend in the axial direction and then radially inward along the radial windings as illustrated in FIG. 14A. There can be one or more cooling channels integrated into the winding supports with any number of inlets and outlets depending on the power rating. In various embodiments, cooling channels can be included in the stator winding yoke within the stator support as was previously described.

Figure 14B:
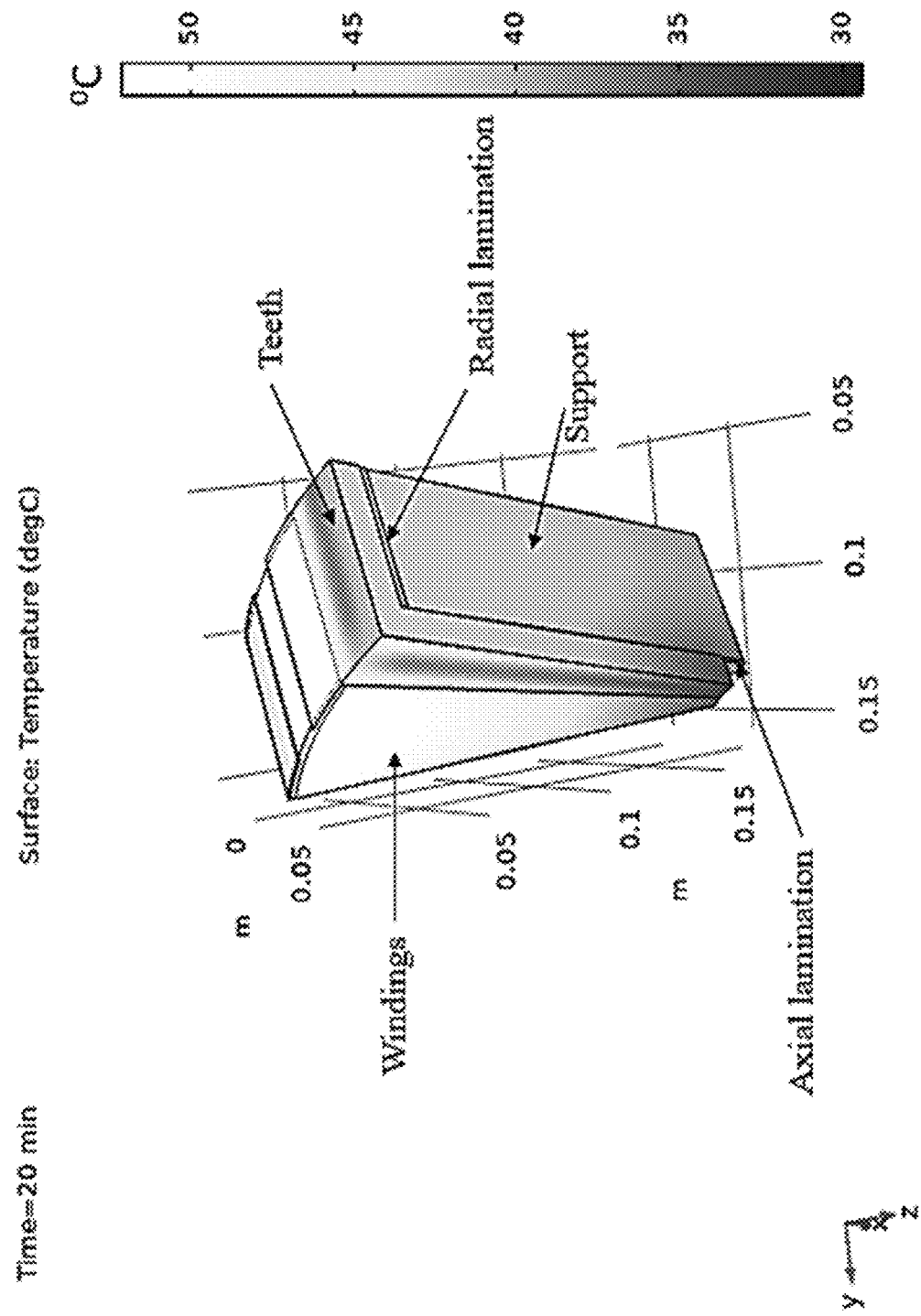

A CFD analysis was performed with controlled flow rates to accurately determine the temperature distribution and temperature rise in different sections cooled by the WELC. To reduce computational complexity, only a section of the stator comprising two winding supports and one winding (including radial and axial portions) was considered. FIG. 14B illustrates an example of the simulation section. Copper and core losses were introduced in the simulation as the internal heat source in the winding and yoke, respectively. A coolant mixture of water-ethylene glycol (60-40%) was utilized as it is a widely used coolant, but other available coolants may be used as well. The temperature distribution determined by the CFD analysis within the 3D-airgap machine is shown in FIG. 14B. A continuous current density of 26 A/mm$^2$ can be achieved, which is a 100% improvement over conventional liquid cooling.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An electric machine, comprising:
   a stator assembly comprising a plurality of stator windings supported by a stator core, each of the plurality of stator windings comprising a first portion extending along an axial length of the stator core and a second portion at a first end of the stator core that extends radially inward towards a shaft of the electric machine, where the first portion is held along the axial length by a winding support of the stator core, the winding support including a cooling channel extending axially through the winding support and the first portion of the supported stator winding; and
   an outer rotor assembly comprising a radial plate surrounding the stator assembly and an endplate at a first end of the radial plate adjacent to the first end of the stator core, the radial plate comprising a plurality of magnets distributed about the radial plate.

2. The electric machine of claim 1, wherein the second portion of each stator winding extends radially inward in a triangular or trapezoid fashion with a narrower side adjacent to the shaft of the electric machine.

3. The electric machine of claim 1, wherein the endplate comprises a plurality of endplate magnets distributed about the shaft of the electric machine, the plurality of endplate magnets adjacent to the second portion of the plurality of stator core windings.

4. The electric machine of claim 3, wherein the plurality of endplate magnets are distributed in a Halbach magnetization pattern.

5. The electric machine of claim 1, wherein the winding support extends along the second portion of the supported stator winding.

6. The electric machine of claim 5, wherein cooling channels extend axially through the winding support and radially inward toward a center axis of the stator core through the winding support.

7. The electric machine of claim 5, wherein the stator core comprises a stator yoke positioned within and supporting the winding support, the stator yoke comprising yoke cooling channels extending through and distributed around the stator yoke.

8. The electric machine of claim 7, wherein the yoke channels are within an aluminum sleeve.

9. The electric machine of claim 1, wherein the first portion of the stator winding is excited by a first inverter and the second portion of the stator winding is excited by a second invertor.

10. The electric machine of claim 9, wherein the stator core comprises the winding support comprising cooling channels distributed between the plurality of stator windings and the winding support is nonmagnetic.

11. The electric machine of claim 1, wherein the winding support is thermally conductive.

12. The electric machine of claim 11, wherein the winding support comprises a plastic material.

13. The electric machine of claim 7, wherein the cooling channel and yoke cooling channels provide parallel cooling paths of the stator assembly.

14. The electric machine of claim 7, wherein the cooling channel and yoke cooling channels provide series cooling paths of the stator assembly.

15. The electric machine of claim 1, wherein the cooling channel is a liquid cooling channel.

* * * * *